(12) United States Patent
Kido et al.

(10) Patent No.: US 10,084,540 B2
(45) Date of Patent: Sep. 25, 2018

(54) VISIBLE LIGHT COMMUNICATION DEVICE AND VISIBLE LIGHT COMMUNICATION SYSTEM

(71) Applicant: PANASONIC INTELLECTUAL PROPERTY MANAGEMENT CO., LTD., Osaka (JP)

(72) Inventors: Shojiro Kido, Osaka (JP); Shigeaki Yamasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/893,595

(22) Filed: Feb. 10, 2018

(65) Prior Publication Data

US 2018/0248622 A1    Aug. 30, 2018

(30) Foreign Application Priority Data

Feb. 24, 2017 (JP) .................................. 2017-033813

(51) Int. Cl.
*H04B 10/00* (2013.01)
*H04B 10/116* (2013.01)
(Continued)

(52) U.S. Cl.
CPC ......... *H04B 10/116* (2013.01); *H04B 10/502* (2013.01); *H04B 10/801* (2013.01); *H04B 10/808* (2013.01)

(58) Field of Classification Search
CPC .. H04B 10/116; H04B 10/502; H04B 10/801; H04B 10/808; H04B 10/564; H04B 10/50; H05B 33/0815; H05B 37/02
(Continued)

(56) References Cited

U.S. PATENT DOCUMENTS 6,748,180 B2 * 6/2004 Feng .................... H04B 10/502
372/25
7,400,310 B2 * 7/2008 LeMay .............. H05B 33/0818
315/149
(Continued)

FOREIGN PATENT DOCUMENTS

JP    2009-284721    12/2009
JP    2010-118270    5/2010
(Continued)

*Primary Examiner* — Hibret Woldekidan
(74) *Attorney, Agent, or Firm* — Renner Otto Boisselle & Sklar, LLP

(57) ABSTRACT

A visible light communication device includes: a light emitting device that emits visible light when current flows thereto; a power supply circuit that supplies the current that flows to the light emitting device; a switch that switches between ON and OFF states in which current does and does not flow to the light emitting device, respectively; a switch controller that controls the switch state; a voltage detector that detects an input voltage of the light emitting device; a threshold storage that stores information stipulating a threshold voltage; and a determiner that, when the switch is in the ON state and the voltage detector detects an ON voltage, determines whether the ON voltage satisfies a predetermined relationship with the threshold voltage stipulated by the information stored in the threshold storage. The switch controller further latches the switch in the OFF state when the determination by the determiner is affirmative.

9 Claims, 16 Drawing Sheets

(51) Int. Cl.
*H04B 10/80* (2013.01)
*H04B 10/50* (2013.01)

(58) Field of Classification Search
USPC ....... 398/118, 120, 130, 172, 182, 192, 193, 398/197
See application file for complete search history.

(56) References Cited

U.S. PATENT DOCUMENTS

| | | | | |
|---|---|---|---|---|
| 7,619,904 B2* | 11/2009 | LeMay | .............. | H05B 33/0818 |
| | | | | 315/185 S |
| 8,310,166 B2* | 11/2012 | Nagaoka | ............ | H05B 41/2821 |
| | | | | 315/209 R |
| 8,508,151 B2* | 8/2013 | Terazawa | .......... | H02M 3/33507 |
| | | | | 315/276 |
| 9,763,304 B2* | 9/2017 | Kido | .................. | H05B 33/0854 |
| 9,780,875 B2* | 10/2017 | Naruo | ................. | H04B 10/116 |
| 9,814,115 B2* | 11/2017 | Kido | .................... | H05B 33/089 |
| 9,842,477 B2* | 12/2017 | Kido | .................. | G08B 13/2494 |
| 9,949,329 B2* | 4/2018 | Doi | .................... | H05B 33/0845 |
| 9,949,629 B2* | 4/2018 | Gardner | .................... | A61B 1/01 |
| 2011/0222849 A1* | 9/2011 | Han | ..................... | H04B 10/116 |
| | | | | 398/25 |
| 2012/0262070 A1 | 10/2012 | Oshima et al. | | |
| 2015/0098708 A1* | 4/2015 | Kido | .................... | H04B 10/116 |
| | | | | 398/118 |
| 2015/0110500 A1* | 4/2015 | Noguchi | ............... | G02F 1/0316 |
| | | | | 398/142 |
| 2015/0263807 A1* | 9/2015 | Yamasaki | ............ | H04B 10/116 |
| | | | | 398/118 |

FOREIGN PATENT DOCUMENTS

| | | |
|---|---|---|
| JP | 2011-49015 | 3/2011 |
| JP | 2012-221869 | 11/2012 |
| JP | 2015-76684 | 4/2015 |

* cited by examiner

VISIBLE LIGHT COMMUNICATION DEVICE AND VISIBLE LIGHT COMMUNICATION SYSTEM

CROSS REFERENCE TO RELATED APPLICATION

This application claims the benefit of priority of Japanese Patent Application Number 2017-033813 filed on Feb. 24, 2017, the entire content of which is hereby incorporated by reference.

BACKGROUND

1. Technical Field

The present disclosure relates to a visible light communication device and visible light communication system that perform visible light communication.

2. Description of the Related Art

A conventional visible light communication device that includes a light emitting device that emits visible light and transmits a visible light signal to an external destination by controlling the lighting state of the light emitting device is known (for example, see Japanese Unexamined Patent Application Publication No. 2015-76684).

SUMMARY

With the conventional visible light communication device, when a short circuit failure occurs in the light emitting device, the short circuit failure may cause an abnormal current to flow. This abnormal current may damage the circuitry of the visible light communication device.

The present disclosure has been conceived in view of the above problem and has an object to provide a visible light communication device and visible light communication system capable of reducing, more so than with conventional techniques, the probability that an abnormal current will flow even when a short circuit failure occurs in the light emitting device.

A visible light communication device according to one aspect of the present disclosure performs visible light communication and includes: a light emitting device that emits visible light when current flows to the light emitting device; a power supply circuit that supplies the current that flows to the light emitting device; a switch that switches between an ON state in which the switch passes the current to the light emitting device and an OFF state in which the switch does not pass the current to the light emitting device; a switch controller that controls a state of the switch; a voltage detector that detects an input voltage of the light emitting device; a threshold storage that stores information stipulating a threshold voltage; and a determiner that, when the switch is in the ON state and the voltage detector detects an ON voltage, determines whether the ON voltage satisfies a predetermined relationship with the threshold voltage stipulated by the information stored in the threshold storage. The switch controller further latches the switch in the OFF state when a determination by the determiner is affirmative.

A visible light communication system according to one aspect of the present disclosure includes: the above-described visible light communication device; and a reception device that receives a visible light signal transmitted by the visible light communication device.

With the visible light communication device and visible light communication system according to one aspect of the present disclosure, it is possible to reduce, more so than with conventional techniques, the probability that an abnormal current will flow even when a short circuit failure occurs in the light emitting device.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes exemplary embodiments with reference to the drawings. Each of the embodiments described below is merely one specific example of the present disclosure. The numerical values, shapes, materials, elements, arrangement and connection of the elements, steps (processes) and order of the steps, etc., described in the following embodiments are given merely by way of illustration and are not intended to limit the present disclosure. Therefore, among elements in the following embodiments, those not recited in any one of the independent claims defining the broadest inventive concept are described as optional elements. Also note that the figures are schematic illustrations and are not necessarily precise depictions.

Embodiment 1

Hereinafter, visible light communication device 1 according to one embodiment of the present disclosure will be described.

(1-1. Configuration)

(1-1-1. Configuration of Visible Light Communication Device 1)

Figure 1:
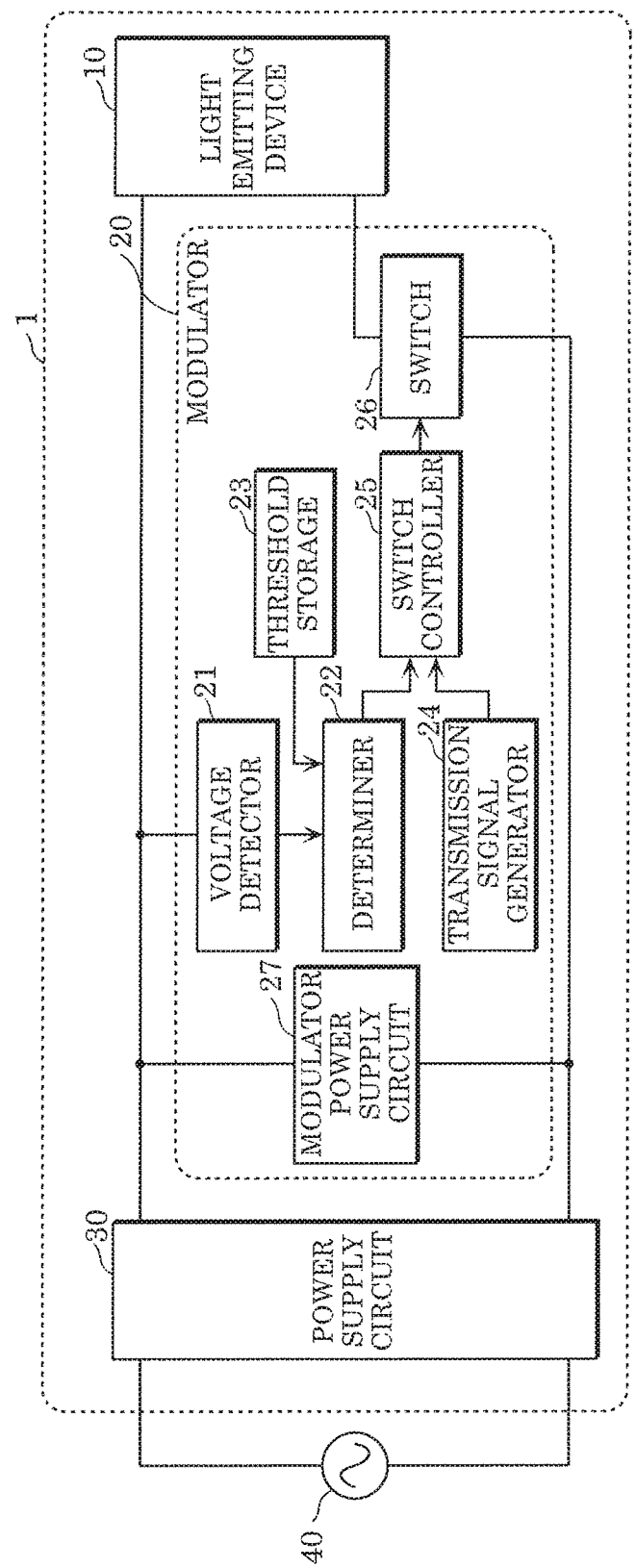
FIG. 1 is a block diagram illustrating a configuration of a visible light communication device according to Embodiment 1.

FIG. 1 is a block diagram illustrating a configuration of visible light communication device 1 that performs visible light communication.

As illustrated in FIG. 1, visible light communication device 1 includes light emitting device 10, modulator 20, and power supply circuit 30. Modulator 20 includes voltage detector 21, determiner 22, threshold storage 23, transmission signal generator 24, switch controller 25, switch 26, and modulator power supply circuit 27.

Light emitting device 10 emits visible light when current flows thereto. Light emitting device 10 is, for example, an LED light source.

Figure 2:
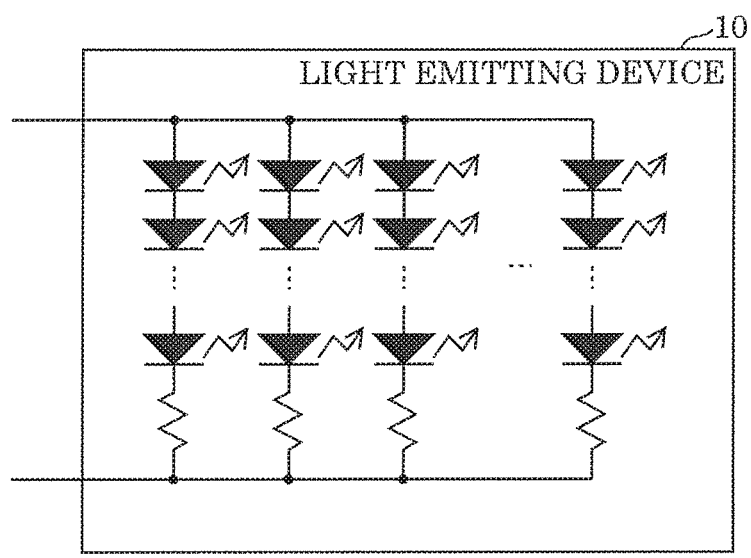
FIG. 2 is a block diagram illustrating a configuration of an LED light source, which is one example of a light emitting device according to Embodiment 1.

FIG. 2 is a block diagram illustrating a configuration of an LED light source, which is one example of light emitting device 10.

As illustrated in FIG. 2, the LED light source includes a plurality of rows of LED elements. The LED elements in each row are connected together in series, and the plurality of rows are connected together in parallel. In FIG. 2, resistors are illustrated in each row of LED elements as current limiting elements, but the current limiting elements may be, for example, constant current elements.

The load equivalent resistance of light emitting device 10 is, for example 2 Ω, and the load equivalent resistance of light emitting device 10 when there is a short circuit failure in light emitting device 10 is, for example, 0.1 Ω or less.

Returning to FIG. 1 again, description of visible light communication device 1 will continue.

Power supply circuit 30 is a power supply that supplies the current that flows to light emitting device 10. For example, power supply circuit 30 is a fixed voltage AC/DC power supply that converts 100 V AC voltage from utility power supply 40 into 12 V or 24 V DC voltage.

Switch 26 is a switch that switches between an ON state in which switch 26 passes current to light emitting device 10 and an OFF state in which switch 26 does not pass current to light emitting device 10. Switch 26 is configured of, for example, a metal oxide semiconductor field effect transistor (MOSFET).

Transmission signal generator 24 generates and outputs a transmission signal to be transmitted in visible light communication. For example, transmission signal generator 24 is implemented as a microcomputer that executes a program. Here, the transmission signal is, for example, a digital signal for visible light communication that is defined by the International Electrotechnical Commission (IEC).

Voltage detector 21 detects an input voltage of light emitting device 10. For example, voltage detector 21 is implemented as a resistor and a microcomputer that executes a program.

Threshold storage 23 stores information stipulating a threshold voltage. For example, threshold storage 23 is implemented as memory and a microcomputer that executes a program. For example, when switch 26 is in the OFF state, threshold storage 23 may store a rate (hereinafter referred to as "voltage rate") for the OFF voltage detected by voltage detector 21.

When switch 26 is in the ON state and an ON voltage is detected by voltage detector 21, determiner 22 determines whether the ON voltage satisfies a predetermined relationship with the threshold voltage stipulated by the voltage stored in threshold storage 23. Here, the predetermined relationship may be, for example, that the detected ON voltage is less than the threshold voltage. For example, determiner 22 is implemented as memory and a microcomputer that executes a program. Moreover, for example, when the determination by determiner 22 is affirmative, determiner 22 may output a gate signal to switch controller 25. Here, a gate signal is a signal with a logical value of "0" when the determination is affirmative and a logical value of "1" when the determination is not affirmative.

Figure 3A:
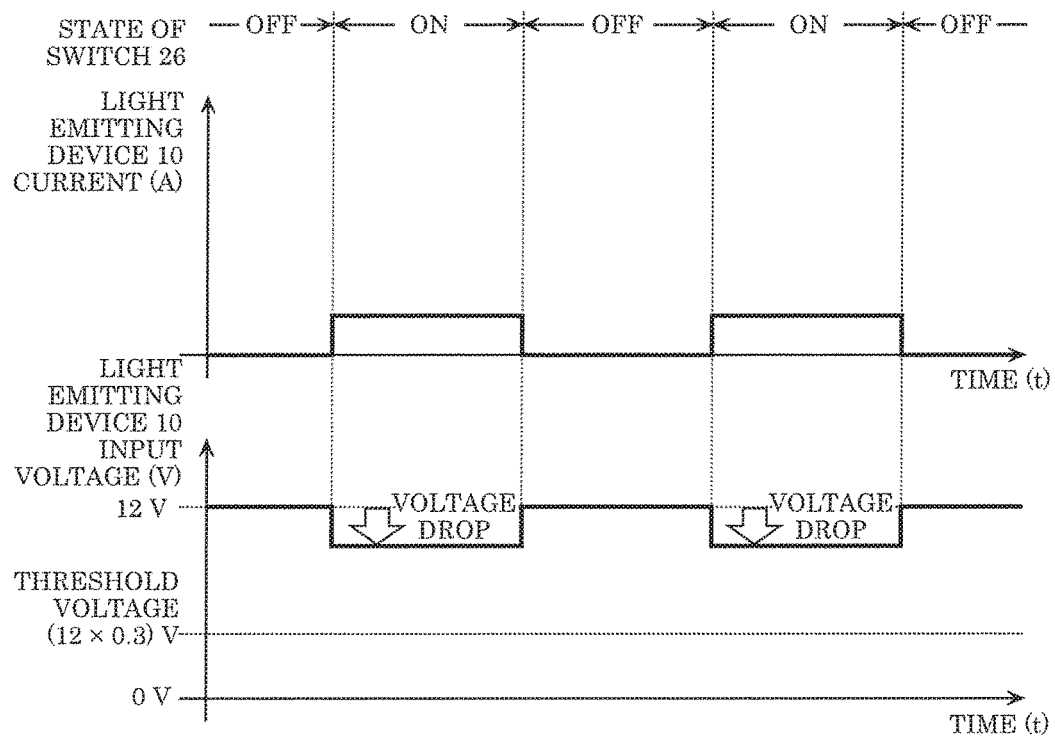
FIG. 3A schematically illustrates one example of input voltage of a light emitting device according to Embodiment 1.
Figure 3B:
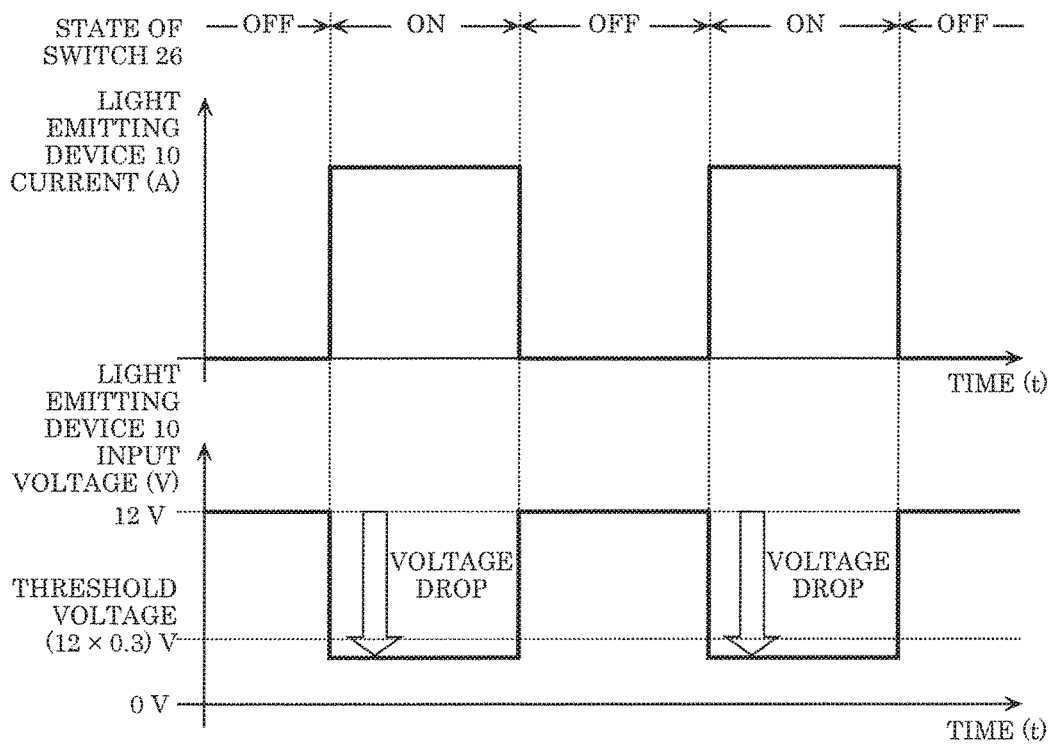
FIG. 3B schematically illustrates one example of input voltage of a light emitting device according to Embodiment 1.

FIG. 3A schematically illustrates one example of the input voltage of light emitting device 10 detected by voltage detector 21 when the output voltage of power supply circuit 30 is 12 V and a short circuit failure has not occurred in light emitting device 10. FIG. 3B schematically illustrates one example of the input voltage of light emitting device 10 detected by voltage detector 21 when the output voltage of power supply circuit 30 is 12 V and a short circuit failure has occurred in light emitting device 10.

As illustrated in FIG. 3A, when a short circuit failure has not occurred in light emitting device 10, while switch 26 is in the ON state, current flows to light emitting device 10, and while switch 26 is OFF, current does not flow to light emitting device 10. Moreover, while switch 26 is in the ON state, the voltage decreases (hereinafter, this decreased voltage is also referred to as "first decreased voltage") due to the current flowing to light emitting device 10 in which a short circuit failure has not occurred. Accordingly, the input voltage of light emitting device 10 drops below 12 V, which is the output voltage of power supply circuit 30. On the other hand, while switch 26 is OFF, the voltage does not decrease since no current is flowing to light emitting device 10. Accordingly, the input voltage of light emitting device 10 is equal to 12 V, which is the output voltage of power supply circuit 30.

As illustrated in FIG. 3B, when a short circuit failure has occurred in light emitting device 10, while switch 26 is in the ON state, current flows to light emitting device 10, and when switch 26 is OFF, current does not flow to light emitting device 10, similar to as described above. Moreover, while switch 26 is in the ON state, since the voltage decreases (hereinafter, this decreased voltage is also referred to as "second decreased voltage") due to the current flowing to light emitting device 10 in which a short circuit failure has occurred, the input voltage of the light emitting device drops below 12 V, which is the output voltage of power supply circuit 30. However, the amount of current flowing to light emitting device 10 is greater when a short circuit failure has occurred in light emitting device 10 than when a short circuit failure has not occurred in light emitting device 10. Accordingly, the second decreased voltage is higher than the first decreased voltage. On the other hand, while switch 26 is OFF, the voltage does not decrease since no current is flowing to light emitting device 10. Accordingly, the input voltage of light emitting device 10 is equal to 12 V, which is the output voltage of power supply circuit 30.

Both the first decreased voltage and the second decreased voltage can be calculated when designing visible light communication device 1. Accordingly, it is possible to set the threshold voltage stipulated by information stored in threshold storage 23 to a value that is lower than the first decreased voltage and higher than the second decreased voltage. This allows determiner 22 to determine that a short circuit failure has occurred in light emitting device 10 when the voltage detected by voltage detector 21 is lower than the threshold voltage. Here, threshold storage 23 is exemplified as storing a voltage rate of 0.3 (30%) as the information stipulating the threshold voltage. In such a case, the threshold voltage is 12 V×0.3=3.6 V.

Figure 4A:
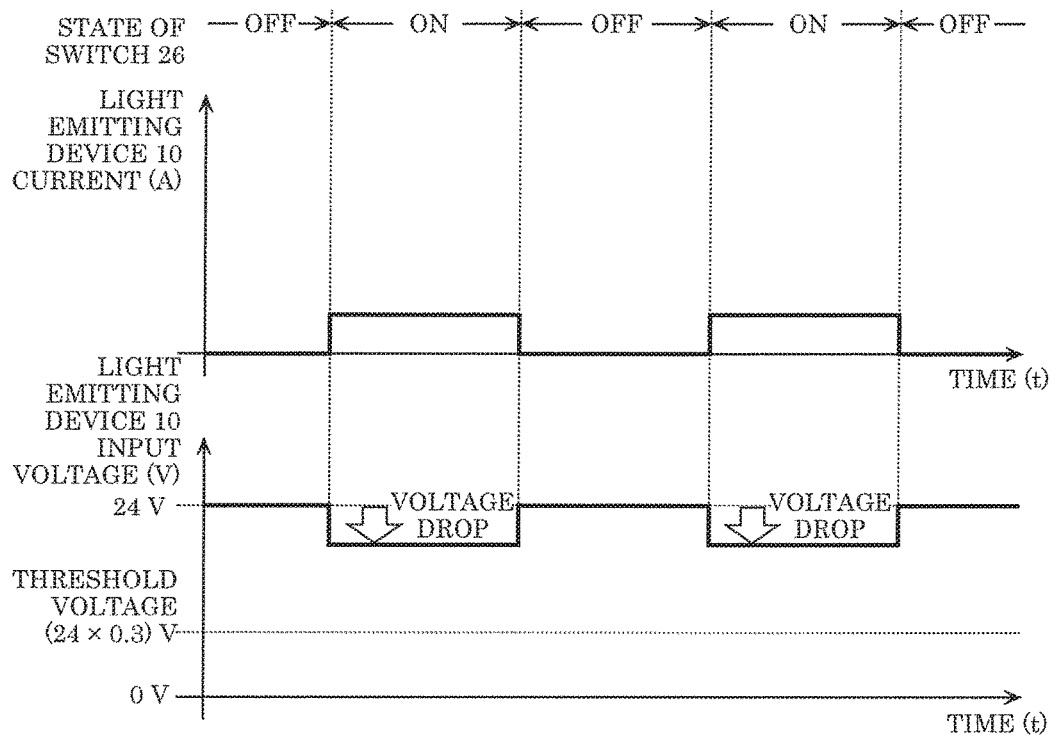
FIG. 4A schematically illustrates one example of input voltage of a light emitting device according to Embodiment 1.
Figure 4B:
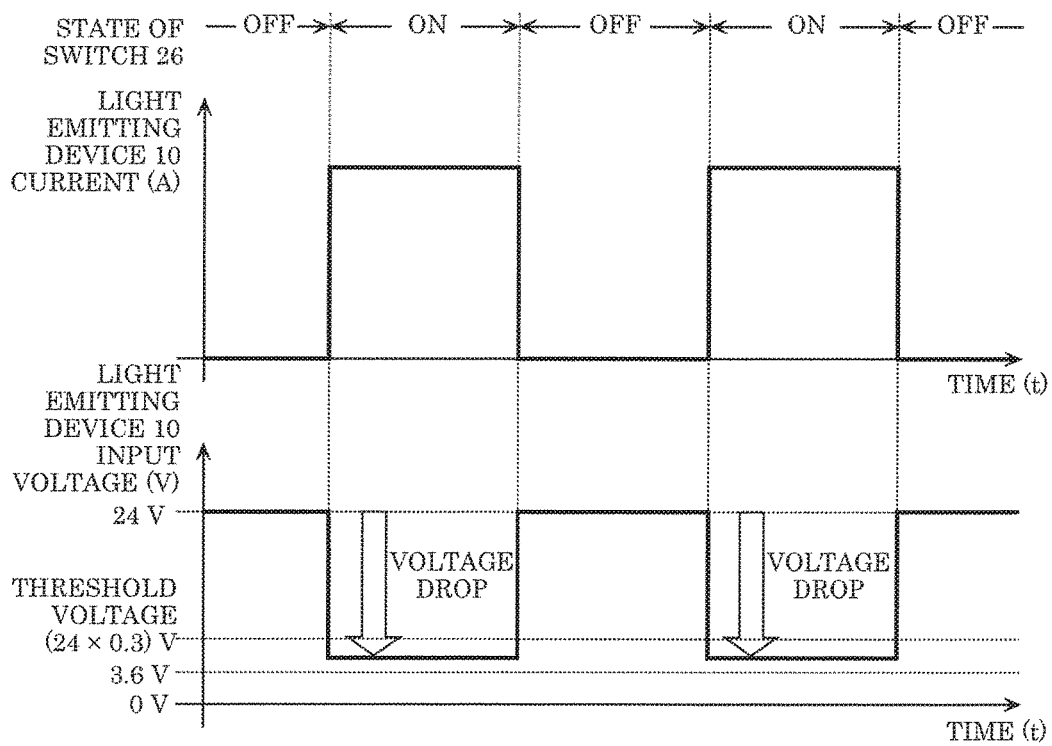
FIG. 4B schematically illustrates one example of input voltage of a light emitting device according to Embodiment 1.

FIG. 4A schematically illustrates one example of the input voltage of light emitting device 10 detected by voltage detector 21 when the output voltage of power supply circuit 30 is 24 V and a short circuit failure has not occurred in light emitting device 10. FIG. 4B schematically illustrates one example of the input voltage of light emitting device 10 detected by voltage detector 21 when the output voltage of power supply circuit 30 is 24 V and a short circuit failure has occurred in light emitting device 10.

When the output voltage of power supply circuit 30 is 24 V, just as when the output voltage of power supply circuit 30 is 12 V, the voltage does not decrease while switch 26 is OFF since no current is flowing to light emitting device 10. Accordingly, the input voltage of light emitting device 10 is equal to the output voltage of power supply circuit 30, which is 24 V. Accordingly, in FIG. 4A and FIG. 4B, the threshold voltage is 24 V×0.3=7.2 V. As illustrated in FIG. 4A and FIG. 4B, the threshold voltage of 7.2 V is lower than the first decreased voltage and higher than the second decreased voltage. This allows determiner 22 to determine that a short circuit failure has occurred in light emitting device 10 when the voltage detected by voltage detector 21 is lower than the threshold voltage, even when the output voltage of power supply circuit 30 is 24 V. Accordingly, in cases where power supply circuit 30 outputs a plurality of voltages, so long as a voltage rate that produces a threshold voltage suitable for each of the voltages is stored, storage of a single voltage rate will suffice.

However, threshold storage 23 is not necessarily limited to this voltage rate storage example. For example, threshold storage 23 may store two threshold voltages—3.6 V and 7.2 V. In this case, for example, the stored threshold voltage to be used is selected in accordance with the OFF voltage detected by voltage detector 21.

Returning to FIG. 1 again, description of visible light communication device 1 will continue.

Switch controller 25 controls the state of switch 26. More specifically, switch controller 25 switches switch 26 between ON and OFF states so that the transmission signal output by transmission signal generator 24 is a visible light communication signal formed by the light emitted by light emitting device 10. Switch controller 25 further latches switch 26 in the OFF state when the determination by determiner 22 is affirmative. In other words, switch controller 25 keeps switch 26 in the OFF state when determiner 22 produces an affirmative determination. For example, switch controller 25 is implemented as memory and a processor that executes a program.

Figure 5:
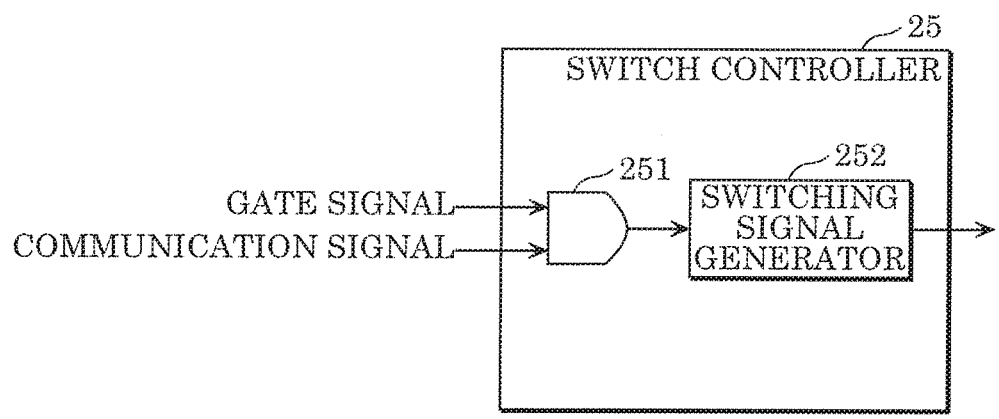
FIG. 5 is a block diagram illustrating a configuration of a switch controller according to Embodiment 1.

FIG. 5 is a block diagram illustrating one example of a configuration of switch controller 25.

As illustrated in FIG. 5, switch controller 25 includes, for example, mask unit 251 and switching signal generator 252.

Mask unit 251 outputs a transmission signal generated by transmission signal generator 24 to switching signal generator 252 when the gate signal output by determiner 22 has a logical value of "1". When the gate signal output by determiner 22 has a logical value of "0", mask unit 251 outputs a mask signal (for example, a transmission signal whose logical value is constantly "0") to switching signal generator 252.

Switching signal generator 252 generates a switching signal for controlling switch 26 in accordance with the transmission signal output by mask unit 251. The switching signal may be a control signal that places switch 26 in an ON state while the logical value of the transmission signal is "1" and places switch 26 in an OFF state while the logical value of the transmission signal is "0".

Returning to FIG. 1 again, description of visible light communication device 1 will continue.

Modulator power supply circuit 27 supplies power to the electrical components included in modulator 20.

In visible light communication device 1 configured as described above, the electrical components included in modulator 20 are mounted on a single circuit board.

(1-1-2. Configuration of Circuit Board 60)

Figure 6:
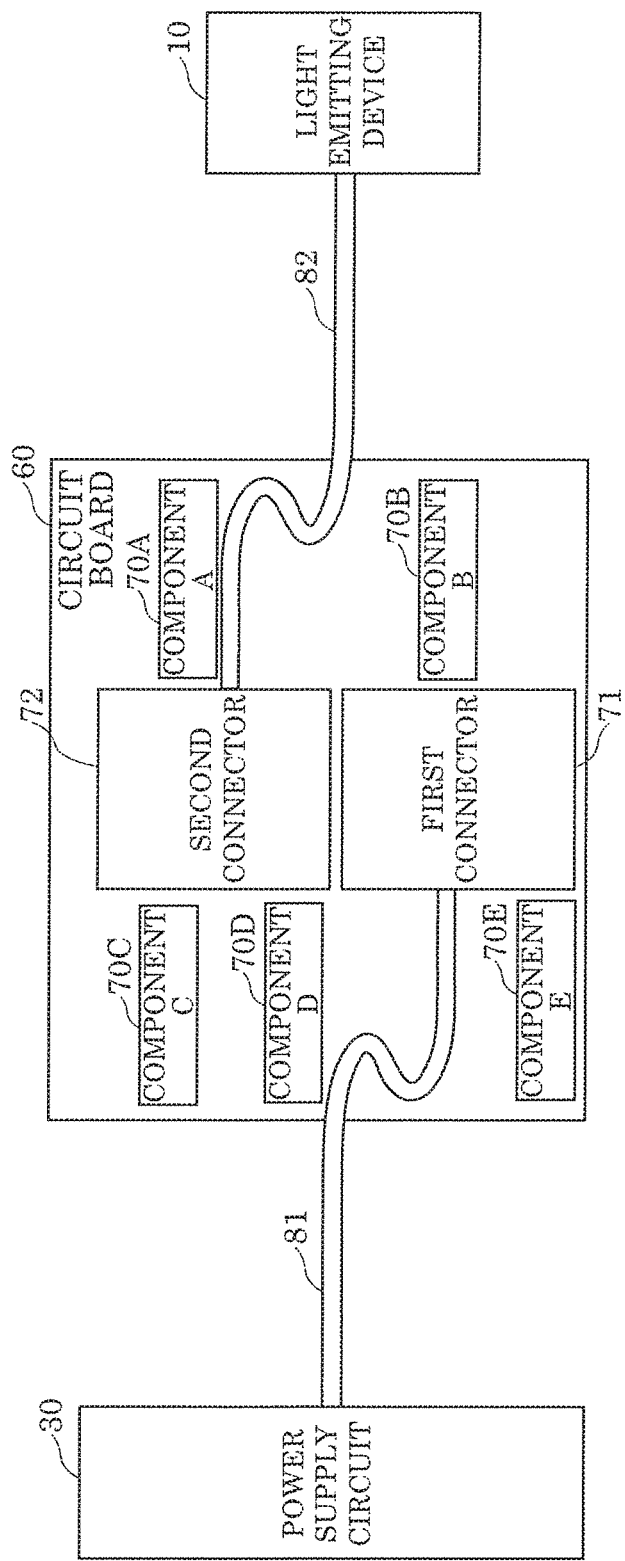
FIG. 6 schematically illustrates electrical components mounted on a circuit board according to Embodiment 1.

FIG. 6 schematically illustrates, for example, electrical components included in modulator 20 mounted on circuit board 60.

As illustrated in FIG. 6, electrical component 70A through electrical component 70E, first connector 71, and second connector 72 included in modulator 20 are mounted on circuit board 60. Power supply circuit 30 and first connector 71 are connected by first power line 81, and light emitting device 10 and second connector 72 are connected by second power line 82.

Among current paths between power supply circuit 30 and light emitting device 10, first power line 81 forms the current path between power supply circuit 30 and first connector 71. First power line 81 is implemented as, for example, an electrically insulated power line.

Among current paths between power supply circuit 30 and light emitting device 10, second power line 82 forms the current path between second connector 72 and light emitting device 10. Second power line 82 is implemented as, for example, an electrically insulated power line.

First connector 71 connects first power line 81 and a printed line that is printed on circuit board 60.

Second connector 72 connects second power line 82 and a printed line that is printed on circuit board 60.

Among current paths between power supply circuit 30 and light emitting device 10, the current path between first connector 71 and second connector 72 is formed as a printed line printed on circuit board 60. The resistance value per unit length of this printed line is higher than the resistance value per unit length of first power line 81 and second power line 82. Accordingly, the distance between first connector 71 and second connector 72 is preferably short.

As illustrated in FIG. 6, first connector 71 and second connector 72 are disposed in the approximate center of circuit board 60. Accordingly, the distance between first connector 71 and second connector 72 is relatively short. With this, among current paths between power supply circuit 30 and light emitting device 10, the resistance value of the current path between first connector 71 and second connector 72 can be kept relatively low.

Circuit board 60 is housed in a housing case that is waterproofed to prevent water from penetrating in.

Figure 7A:
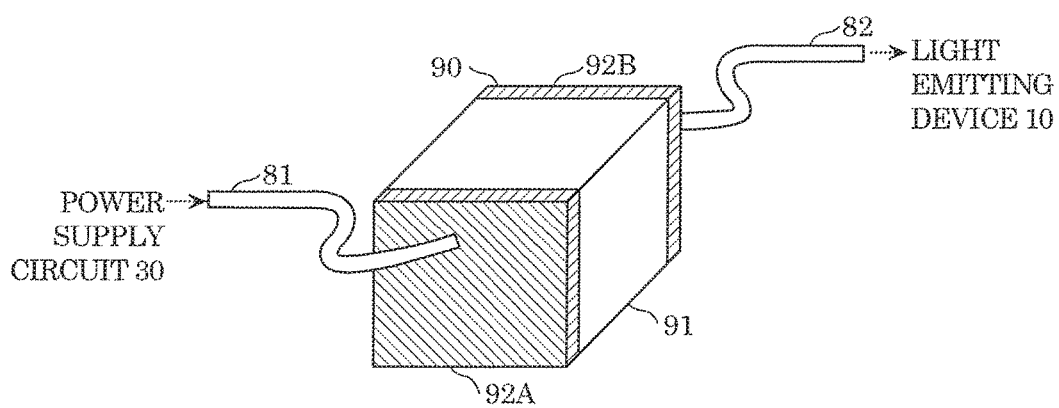
FIG. 7A is a perspective view of a housing case according to Embodiment 1.
Figure 7B:
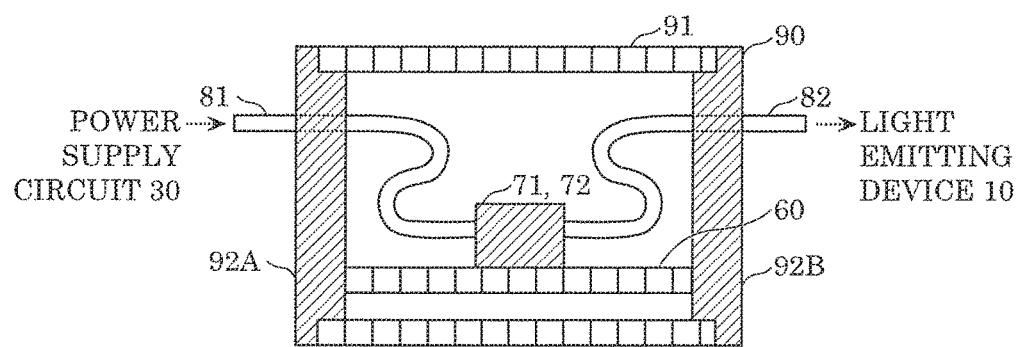
FIG. 7B is a side view of a housing case according to Embodiment 1.

FIG. 7A is a perspective view of housing case 90 that houses circuit board 60. FIG. 7B is a side view of housing case 90 illustrated as if the side surface pictured were transparent.

As illustrated in FIG. 7A and FIG. 7B, housing case 90 includes aluminum square tube 91, rubber plug 92A, and rubber plug 92B.

Rubber plug 92A is for plugging the opening at one end of square tube 91, and has a through-hole for passing through first power line 81. In a state in which first power line 81 is inserted through the through-hole, rubber plug 92A is waterproofed to prevent water from entering square tube 91.

Rubber plug 92B is for plugging the opening at the other end of square tube 91, and has a through-hole for passing through second power line 82. In a state in which second power line 82 is inserted through the through-hole, rubber plug 92B is waterproofed to prevent water from entering square tube 91.

Circuit board 60 is disposed in square tube 91 whose openings are plugged with rubber plug 92A and rubber plug 92B.

As described above, first connector 71 and second connector 72 are disposed in the approximate center of circuit board 60. Accordingly, as illustrated in FIG. 7B, spaces for housing first power line 81 and second power line 82 in bent states are provided between first connector 71 and the through-hole in rubber plug 92A and between second connector 72 and the through-hole in rubber plug 92B. Accordingly, it is possible to relatively easily house part of first power line 81 and part of second power line 82 in square tube 91.

Housing case 90 is disposed in some location between light emitting device 10 and power supply circuit 30.

Figure 8:
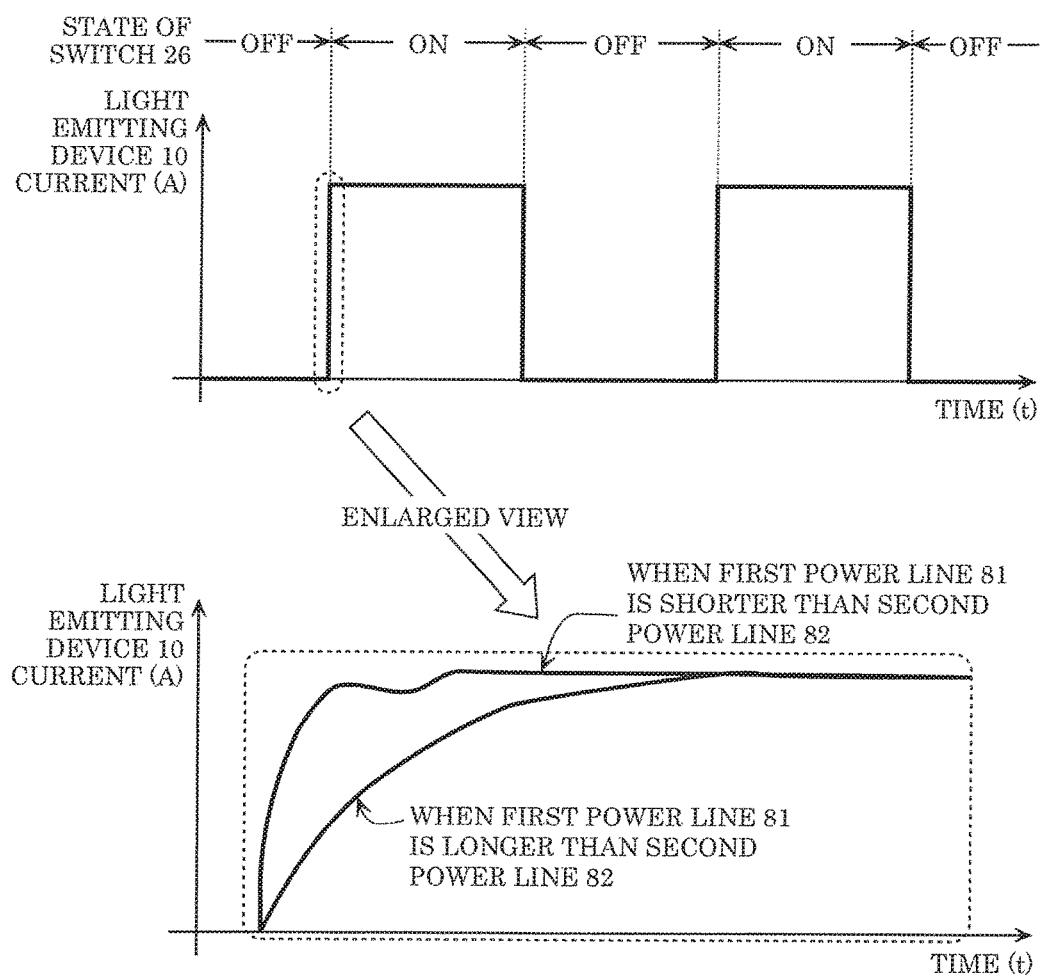
FIG. 8 illustrates waveforms of current flowing to a light emitting device according to Embodiment 1.

FIG. 8 illustrates waveforms of the current flowing to light emitting device 10 when housing case 90 is disposed in a location that makes first power line 81 shorter than second power line 82, and when housing case 90 is disposed in a location that makes first power line 81 longer than second power line 82.

As illustrated in FIG. 8, when switch 26 is switched from an OFF state to an ON state, the current flowing to light emitting device 10 increases more steeply when first power line 81 is shorter than second power line 82.

Accordingly, placing housing case 90 in a location that makes first power line 81 shorter than second power line 82 can be said to be preferable than placing housing case 90 in a location that makes first power line 81 longer than second power line 82.

(1-2. Operations)

Hereinafter, operations performed by visible light communication device 1 having the configuration described above will be described.

Characteristic operations performed by visible light communication device 1 include a first abnormal current inhibiting process. Hereinafter, the first abnormal current inhibiting process will be described.

(1-2-1. First Abnormal Current Inhibiting Process)

The first abnormal current inhibiting process is a process for inhibiting an abnormal current from flowing to visible light communication device 1 even in the event that a short circuit failure occurs in light emitting device 10.

Figure 9:
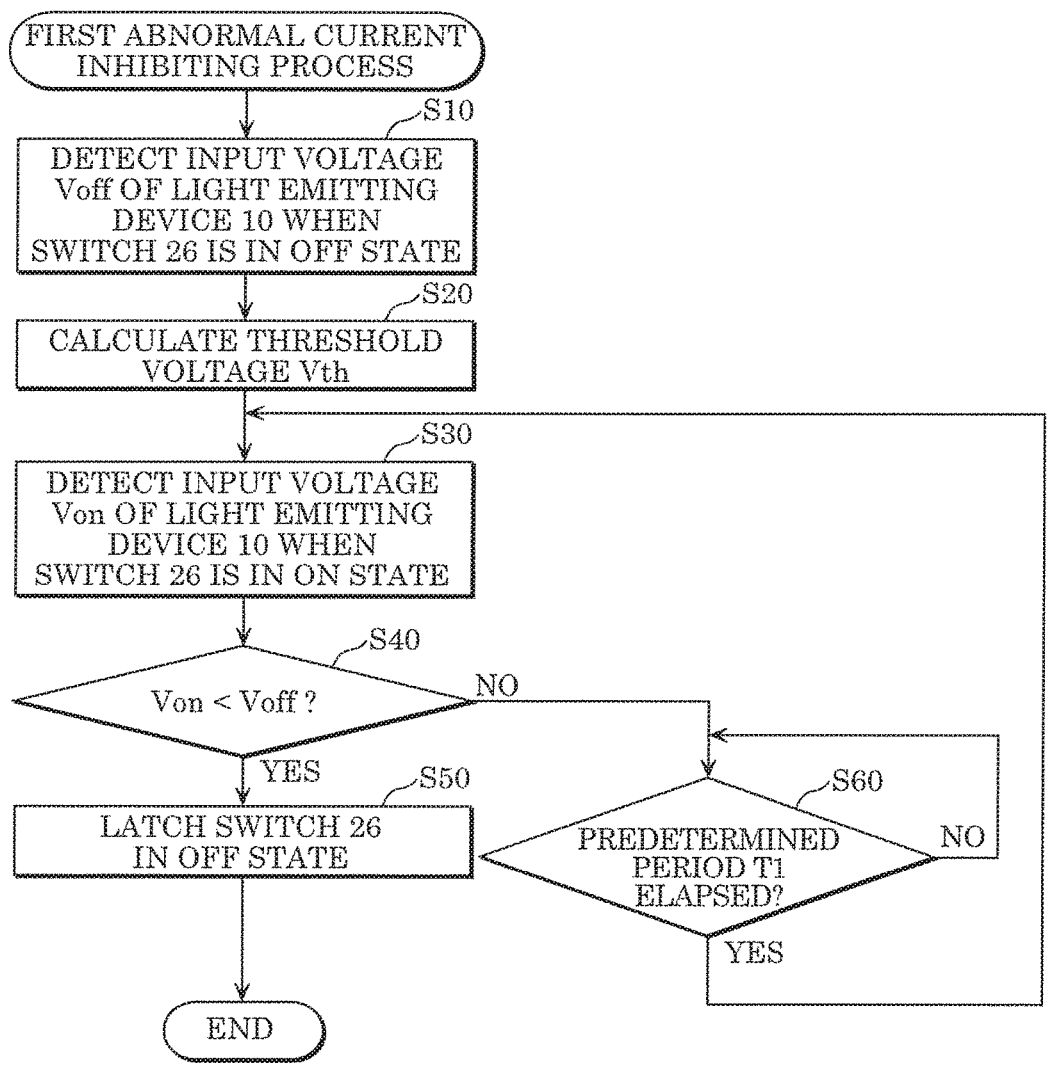
FIG. 9 is a flow chart of a first abnormal current inhibiting process according to Embodiment 1.

FIG. 9 is a flow chart of the first abnormal current inhibiting process.

The first abnormal current inhibiting process starts when visible light communication device 1 is activated.

When the first abnormal current inhibiting process starts, voltage detector 21 detects input voltage Voff of light emitting device 10 when switch 26 is in an OFF state (step S10).

When Voff is detected, determiner 22 multiplies the detected Voff with the voltage rate stored in threshold storage 23 to calculate threshold voltage Vth, and stores the calculated threshold voltage Vth (step S20).

When threshold voltage Vth is detected, voltage detector 21 detects input voltage Von of light emitting device 10 when switch 26 is in an ON state (step S30).

When Von is detected, determiner 22 compares the detected Von with the stored Vth, and determines whether Von is a lower voltage value than Vth or not (step S40).

In step S40, when determiner 22 determines that Von is a lower voltage value than Vth (yes in step S40), switch controller 25 latches switch 26 in the OFF state (step S50). Then, visible light communication device 1 ends the first abnormal current inhibiting process.

In step S40, when determiner 22 determines that Von is not a lower voltage value than Vth (no in step S40), visible light communication device 1 waits until predetermined period T1 (for example, 1 second) has elapsed (no in step S60). After predetermined period T1 has elapsed (no in step S60), visible light communication device 1 returns to step S30 and repeats the subsequent steps.

(1-3. Technical Advantages, Etc.)

As described above, visible light communication device 1 can inhibit an abnormal current from flowing to visible light communication device 1 even when a short circuit failure occurs in light emitting device 10.

Accordingly, even in the event that a short circuit failure occurs in light emitting device 10, with visible light communication device 1, it is possible to prevent the circuitry included in visible light communication device 1 from being damaged by abnormal current resulting from the short circuit failure.

Variation 1

Hereinafter, visible light communication device 1A realized by modifying part of visible light communication device 1 according to Embodiment 1 will be described.

Visible light communication device 1 according to Embodiment 1 is exemplified as latching switch 26 in an OFF state when Von is determined to be a lower voltage value than Vth.

In contrast, visible light communication device 1A is exemplified as latching switch 26 in an OFF state only when Von is determined to be a lower voltage value than Vth N times consecutively (N is an integer that is greater than or equal to 2, such as 3).

(2-1. Configuration)

Visible light communication device 1A has the same hardware configuration as visible light communication device 1 according to Embodiment 1, but some of the operations performed by visible light communication device 1A differ from the operations performed by visible light communication device 1 according to Embodiment 1.

Accordingly, hereinafter, since the configuration of visible light communication device 1A has already been described, repeated description thereof will be omitted, and operations performed by visible light communication device 1A will be described.

(2-2. Operations)

Characteristic operations performed by visible light communication device 1A include a second abnormal current inhibiting process which is partially different from the first abnormal current inhibiting process according to Embodiment 1.

Hereinafter, the description of the second abnormal current inhibiting process will focus on the points of difference from the first abnormal current inhibiting process according to Embodiment 1.

(2-2-1. Second Abnormal Current Inhibiting Process)

Figure 10:
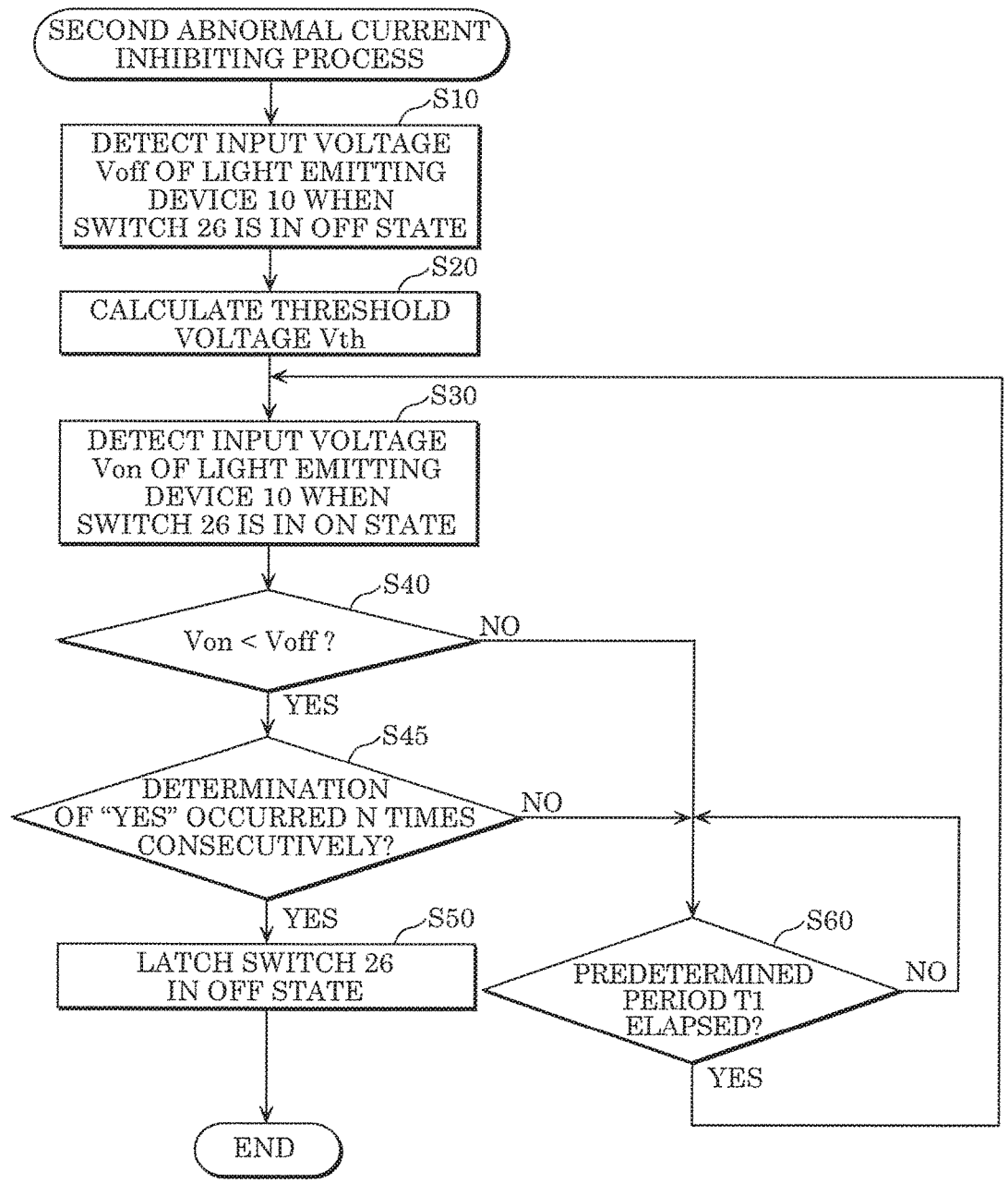
FIG. 10 is a flow chart of a second abnormal current inhibiting process according to Variation 1.

FIG. 10 is a flow chart of the second abnormal current inhibiting process.

As illustrated in FIG. 10, the second abnormal current inhibiting process is realized by adding step S45 to the first abnormal current inhibiting process according to Embodiment 1.

Accordingly, hereinafter, description will focus on step S45.

In step S40, when determiner 22 determines that Von is a lower voltage value than Vth (yes in step S40), determiner 22 further checks whether the determination that Von is a lower voltage value than Vth has occurred N times consecutively or not (step S45).

In step S45, when determiner 22 determines that "the determination that Von is a lower voltage value than Vth has occurred N times consecutively" (yes in step S45), processing proceeds to step S50.

In step S45, when determiner 22 does not determine that "the determination that Von is a lower voltage value than Vth has occurred N times consecutively" (no in step S45), processing proceeds to step S60.

(2-3. Technical Advantages, Etc.)

As described above, visible light communication device 1A latches switch 26 in an OFF state only when Von is determined to be a lower voltage value than Vth consecutively N times.

Accordingly, with visible light communication device 1A, it is possible to reduce the frequency at which switch 26 is erroneously latched, even when a short circuit failure hasn't actually occurred in light emitting device 10, due to Von dropping below Vth from, for example, noise.

Variation 2

Hereinafter, visible light communication device 1B realized by modifying part of visible light communication device 1 according to Embodiment 1 will be described.

Visible light communication device 1 according to Embodiment 1 is exemplified as latching switch 26 in an OFF state when Von is determined to be a lower voltage value than Vth, without setting a particular deadline after visible light communication device 1 is activated.

In contrast, visible light communication device 1B is exemplified as latching switch 26 in an OFF state when Von is determined to be a lower voltage value than Vth, only before elapse of predetermined period T2 (T2>T1; for example, 1 minute) starting when visible light communication device 1B is activated.

(3-1. Configuration)

Visible light communication device 1B has the same hardware configuration as visible light communication device 1 according to Embodiment 1, but some of the operations performed by visible light communication device 1B differ from the operations performed by visible light communication device 1 according to Embodiment 1.

Accordingly, hereinafter, since the configuration of visible light communication device 1B has already been described, repeated description thereof will be omitted, and operations performed by visible light communication device 1B will be described.

(3-2. Operations)

Characteristic operations performed by visible light communication device 1B include a third abnormal current inhibiting process which is partially different from the first abnormal current inhibiting process according to Embodiment 1.

Hereinafter, the description of the third abnormal current inhibiting process will focus on the points of difference from the first abnormal current inhibiting process according to Embodiment 1.

(3-2-1. Third Abnormal Current Inhibiting Process)

Figure 11:
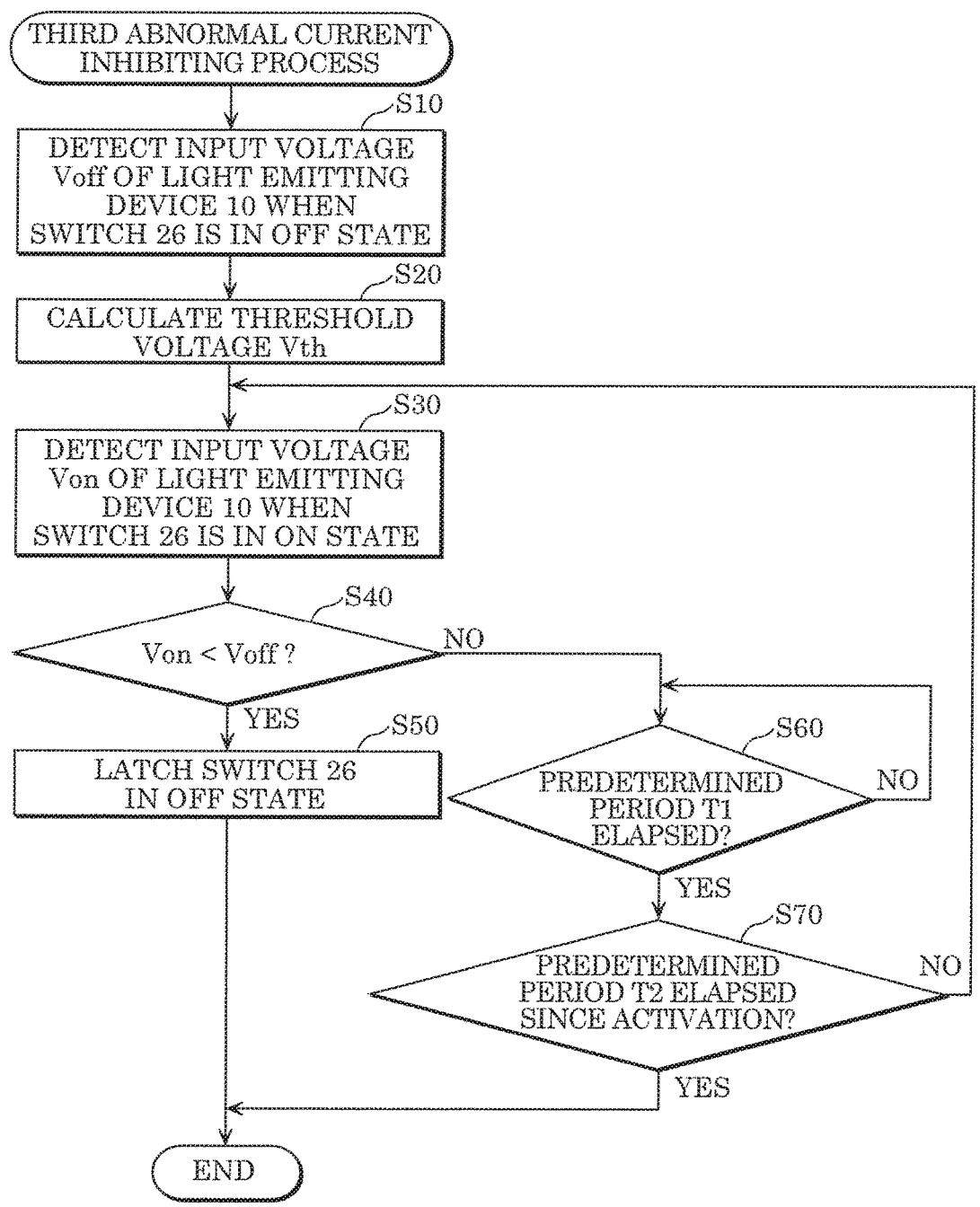
FIG. 11 is a flow chart of a third abnormal current inhibiting process according to Variation 2.

FIG. 11 is a flow chart of the third abnormal current inhibiting process.

As illustrated in FIG. 11, the third abnormal current inhibiting process is realized by adding step S70 to the first abnormal current inhibiting process according to Embodiment 1.

Accordingly, hereinafter, description will focus on step S70.

In step S60, after predetermined period T1 has elapsed, visible light communication device 1B checks whether predetermined period T2 has elapsed since activation of visible light communication device 1B (step S70).

In step S70, when predetermined period T2 has elapsed since activation (yes in step S70), visible light communication device 1B ends the third abnormal current inhibiting process.

In step S70, when predetermined period T2 has not elapsed since activation (no in step S70), visible light communication device 1B returns to step S30 and repeats the subsequent steps.

(3-3. Technical Advantages, Etc.)

In addition to the first abnormal current inhibiting process according to Embodiment 1 and the third abnormal current inhibiting process according to Variation 2, modulator 20 also performs modulation processing pertaining to visible light communication. Accordingly, when the first abnormal current inhibiting process or the third abnormal current inhibiting process are performed while modulation processing is being performed, there is concern that these processes may negatively affect the modulation processing (for example, the timing of the modulation processing at a predetermined transfer rate may become out of sync due to the increase in the processing load).

As described above, visible light communication device 1B limits the period in which third abnormal current inhibiting process is performed to a period spanning from when visible light communication device 1B is activated until T2 has elapsed.

Accordingly, with visible light communication device 1B, it is possible to perform the third abnormal current inhibiting process so as to not negatively affect modulation processing by performing the modulation processing after elapse of T2 starting when visible light communication device 1B is activated.

Variation 3

Hereinafter, visible light communication device 1C realized by modifying part of visible light communication device 1 according to Embodiment 1 will be described.

Visible light communication device 1 according to Embodiment 1 is exemplified as latching switch 26 in an OFF state when Von is determined to be a lower voltage value than Vth, without setting a particular deadline after visible light communication device 1 is activated.

In contrast, visible light communication device 1C is exemplified as latching switch 26 in an OFF state when Von is determined to be a lower voltage value than Vth, only after elapse of predetermined period T3 (for example, 1 hour) starting when visible light communication device 1C is activated.

(4-1. Configuration)

Visible light communication device 1C has the same hardware configuration as visible light communication device 1 according to Embodiment 1, but some of the operations performed by visible light communication device 1C differ from the operations performed by visible light communication device 1 according to Embodiment 1.

Accordingly, hereinafter, since the configuration of visible light communication device 1C has already been described, repeated description thereof will be omitted, and operations performed by visible light communication device 1C will be described.

(4-2. Operations)

Characteristic operations performed by visible light communication device 1C include a fourth abnormal current inhibiting process which is partially different from the first abnormal current inhibiting process according to Embodiment 1.

Hereinafter, the description of the fourth abnormal current inhibiting process will focus on the points of difference from the first abnormal current inhibiting process according to Embodiment 1.

(4-2-1. Fourth Abnormal Current Inhibiting Process)

Figure 12:
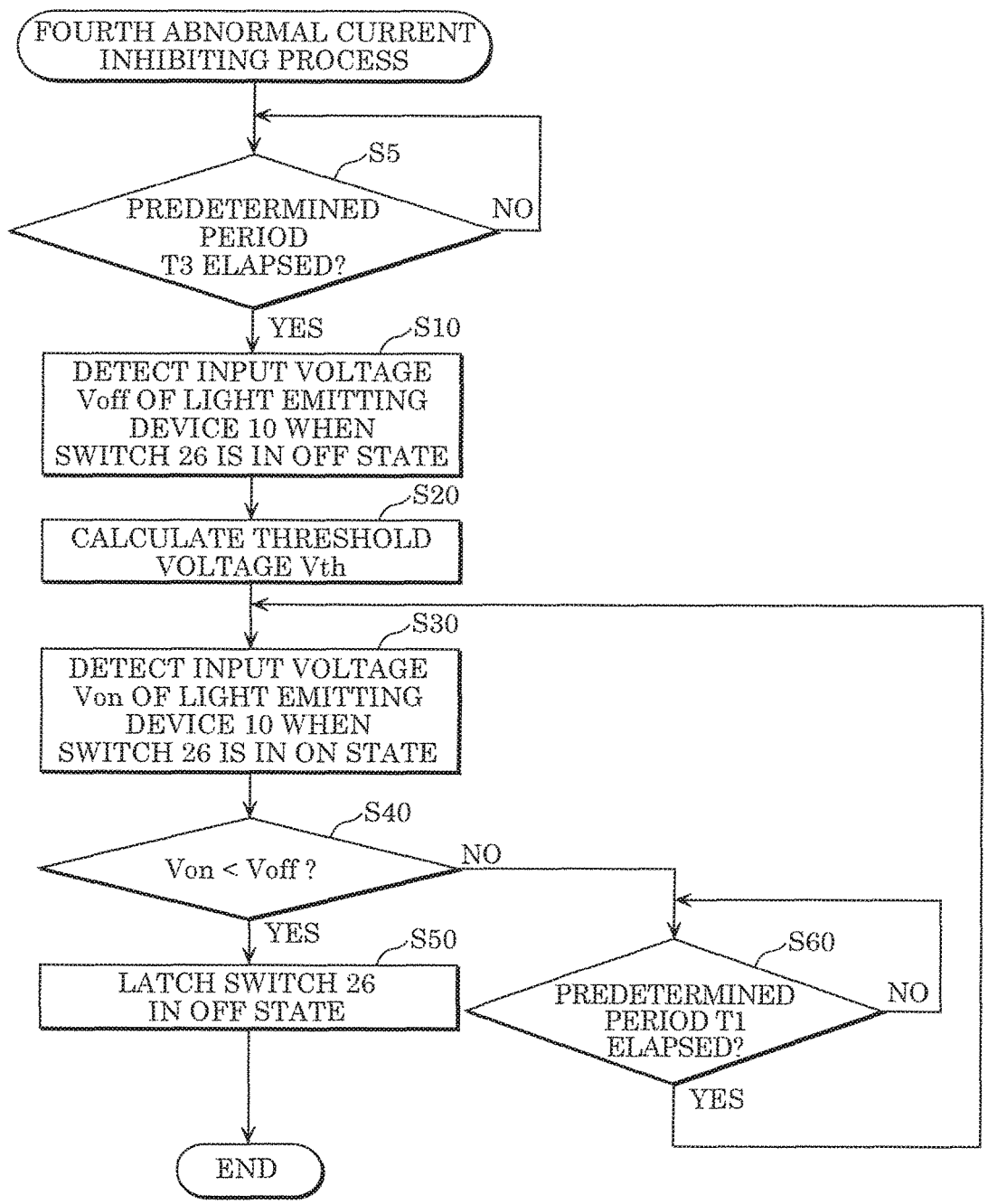
FIG. 12 is a flow chart of a fourth abnormal current inhibiting process according to Variation 3.

FIG. 12 is a flow chart of the fourth abnormal current inhibiting process.

As illustrated in FIG. 12, the fourth abnormal current inhibiting process is realized by adding step S5 to the first abnormal current inhibiting process according to Embodiment 1.

Accordingly, hereinafter, description will focus on step S5.

When the fourth abnormal current inhibiting process starts, voltage detector 21 delays the detection of the input voltage of light emitting device 10 until predetermined period T3 has elapsed (no in step S5 repeats).

In step S5, when predetermined period T3 has elapsed (yes in step S5), voltage detector 21 ends the delay and proceeds to step S10.

(4-3. Technical Advantages, Etc.)

Visible light communication device 1C may be activated and tests may be run while visible light communication device 1C is being manufactured at a manufacturing facility. While various tests are being run, for example, if step S50 is performed, it may negatively affect these tests.

As described above, visible light communication device 1C does not proceed to step S50 until predetermined period T3 has elapsed after activation.

Accordingly, with visible light communication device 1C, it is possible to inhibit the above-described negative effects by performing the tests before the elapse of predetermined period T3 after activation.

Embodiment 2

Hereinafter, light sign board 100 including a plurality of visible light communication devices 101 according to one embodiment of the present disclosure will be described.

(5-1. Configuration)

Figure 13:
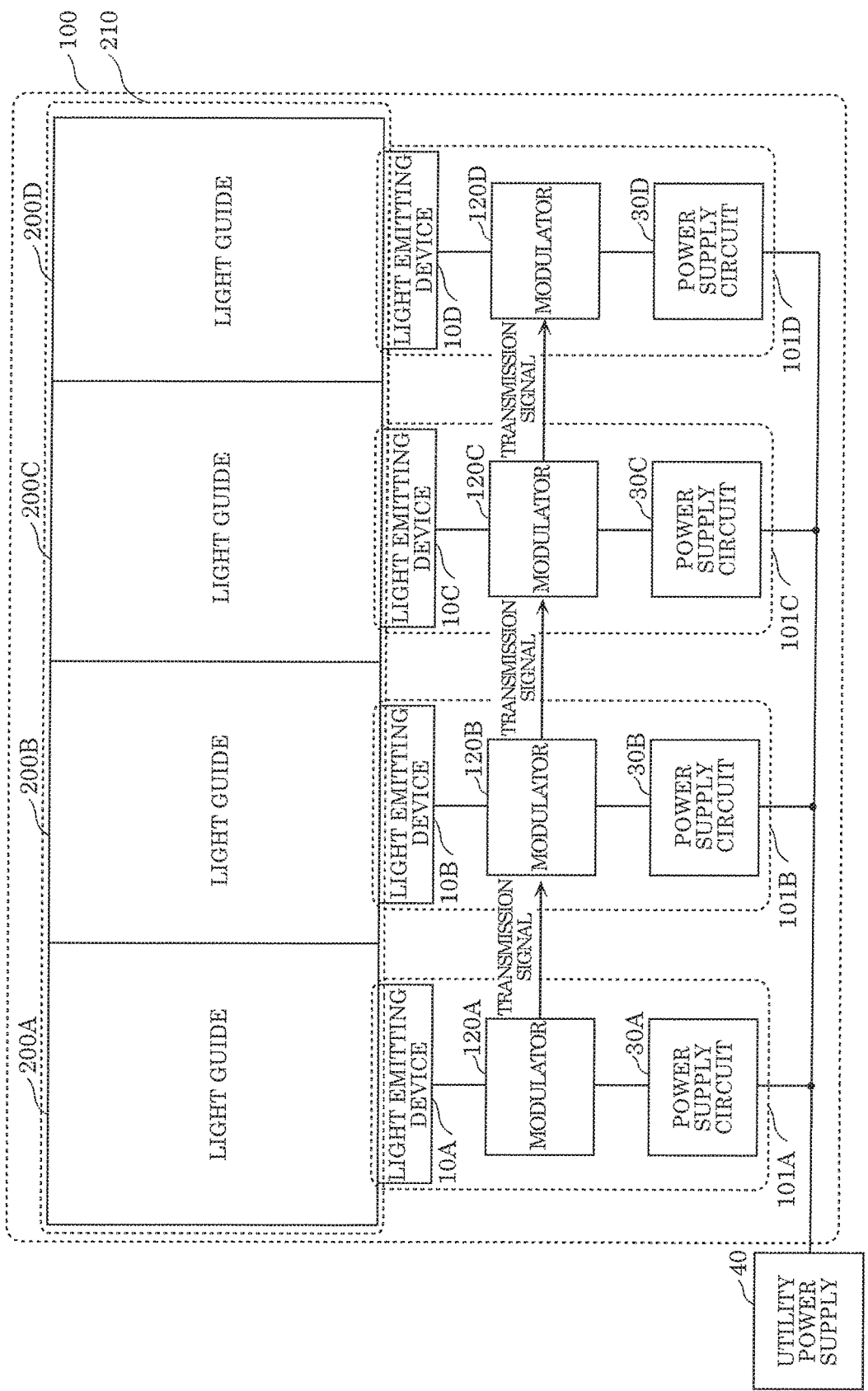
FIG. 13 is a block diagram illustrating a configuration of a light sign board according to Embodiment 2.

FIG. 13 is a block diagram illustrating a configuration of light sign board 100.

As illustrated in FIG. 13, light sign board 100 includes a plurality of visible light communication devices 101 (here, four visible light communication devices 101A through 101D) and light sign panel 210.

Visible light communication device 101 is realized by modifying part of visible light communication device 1 according to Embodiment 1.

Figure 14:
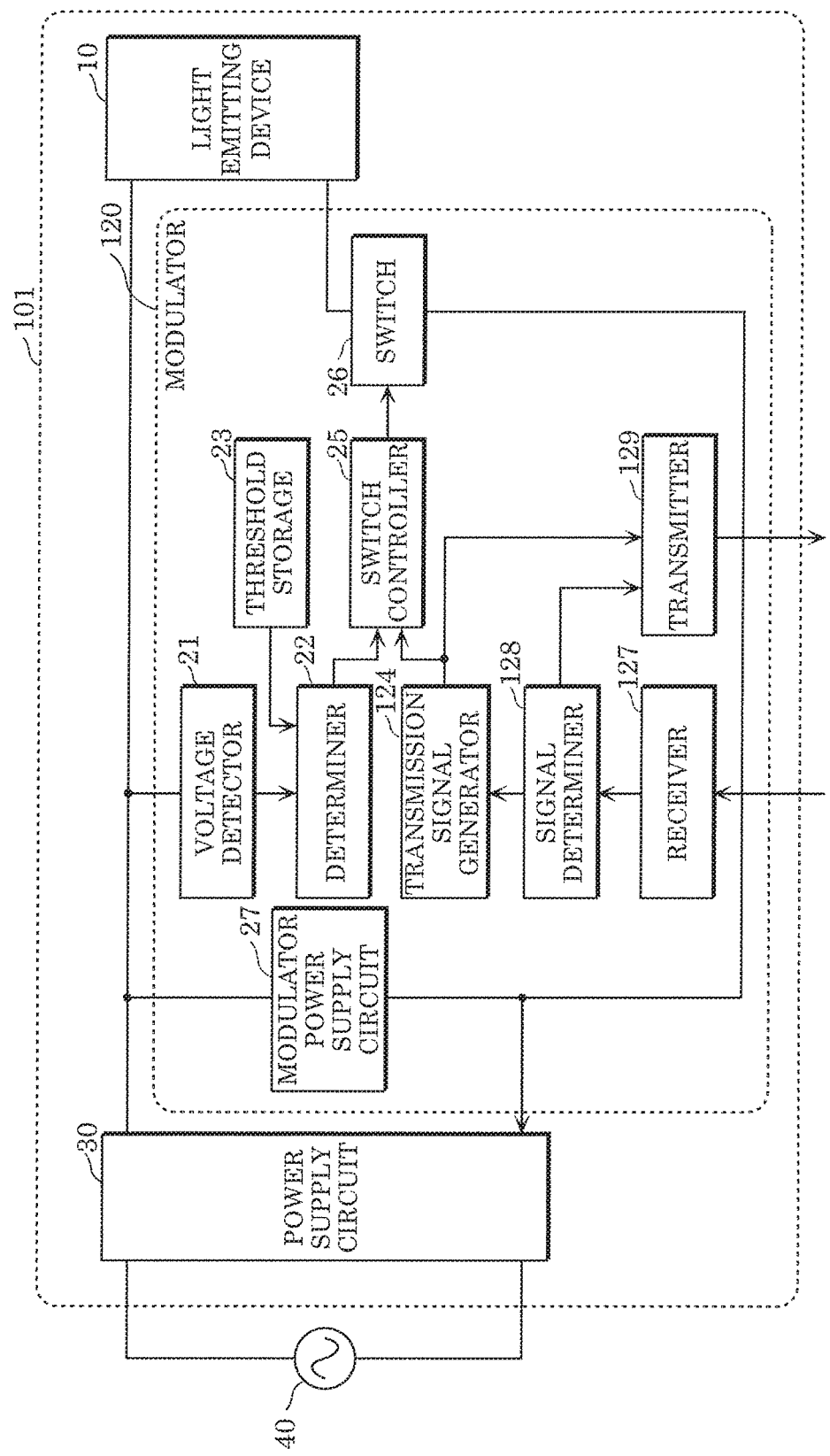
FIG. 14 is a block diagram illustrating a configuration of a visible light communication device according to Embodiment 2.

FIG. 14 is a block diagram illustrating a configuration of visible light communication device 101.

As illustrated in FIG. 14, visible light communication device 101 differs from visible light communication device 1 according to Embodiment 1 in that receiver 127, signal determiner 128, and transmitter 129 are additionally provided and transmission signal generator 24 is changed to transmission signal generator 124. With these changes, modulator 20 according to Embodiment 1 is changed to modulator 120.

Here, the description of the configuration of visible light communication device 101 will focus on the points of difference with visible light communication device 1 according to Embodiment 1.

Receiver 127 receives signals transmitted from an external source. When receiver 127 is connected to transmitter 129 of another visible light communication device 101 by wire, receiver 127 receives signals transmitted by wire from that transmitter 129. For example, receiver 127 is implemented as a reception circuit and a microcomputer that executes a program.

Signal determiner 128 determines whether the signal received by receiver 127 is in a predetermined format. When the determination is affirmative, the received signal is output to transmission signal generator 124. When the determination is not affirmative, the received signal is not output to transmission signal generator 124, and a transmission suspension signal indicating that transmission of signals is suspended is output to transmitter 129. For example, signal determiner 128 is implemented as a microcomputer that executes a program. The signal in the predetermined format may be a digital signal for visible light communication that is defined by the IEC.

In addition to the functions of transmission signal generator 24 according to Embodiment 1, transmission signal generator 124 further has the following functions. When a signal is output from signal determiner 128, transmission signal generator 124 outputs that signal as a transmission signal. Transmission signal generator 124 also outputs the transmission signal to transmitter 129 in addition to switch controller 25, which is the output destination of transmission signal generator 24 according to Embodiment 1. For example, transmission signal generator 124 is implemented as a microcomputer that executes a program.

When a transmission signal is output from transmission signal generator 124, transmitter 129 transmits that signal to an external destination regardless of whether switch 26 is latched by switch controller 25 or not. Stated differently, when receiver 127 has received a signal and the determination of that signal by signal determiner 128 is affirmative, transmitter 129 transmits that signal to an external destination regardless of whether switch 26 is latched by switch controller 25 or not. When transmitter 129 is connected to receiver 127 of another visible light communication device 101 by wire, transmitter 129 transmits the signal to that receiver 127 by wire. Moreover, when a transmission suspension signal is output by signal determiner 128, transmitter 129 suspends transmission of signals to an external destination. For example, transmitter 129 is implemented as a transmission circuit and a microcomputer that executes a program.

Returning to FIG. 13 again, description of light sign board 100 will continue.

As illustrated in FIG. 13, modulator 120A of visible light communication device 101A and modulator 120B of visible light communication device 101B are connected. More specifically, transmitter 129 of modulator 120A and receiver 127 of modulator 120B are connected by wire. Moreover, modulator 120B of visible light communication device 101B and modulator 120C of visible light communication device 101C are connected. More specifically, transmitter 129 of modulator 120B and receiver 127 of modulator 120C are connected by wire. Moreover, modulator 120C of visible light communication device 101C and modulator 120D of visible light communication device 101D are connected. More specifically, transmitter 129 of modulator 120C and receiver 127 of modulator 120D are connected by wire.

With this, the visible light signals transmitted from light emitting device 10A of visible light communication device 101A through light emitting device 10D of visible light communication device 101D are signals based on the transmission signal generated by transmission signal generator 124 of visible light communication device 101A.

Light sign panel 210 is a display that displays, for example, graphics and/or characters, and includes a plurality of light guides (here, four light guides 200A through 200D).

Light guide 200A is connected to light emitting device 10A of visible light communication device 101A, and displays, on its display surface, an image formed from light emitted by light emitting device 10A. Light guide 200B is connected to light emitting device 10B of visible light communication device 101B, and displays, on its display surface, an image formed from light emitted by light emitting device 10B. Light guide 200C is connected to light emitting device 10C of visible light communication device 101C, and displays, on its display surface, an image formed from light emitted by light emitting device 10C. Light guide 200D is connected to light emitting device 10D of visible light communication device 101D, and displays, on its display surface, an image formed from light emitted by light emitting device 10D.

Figure 15:
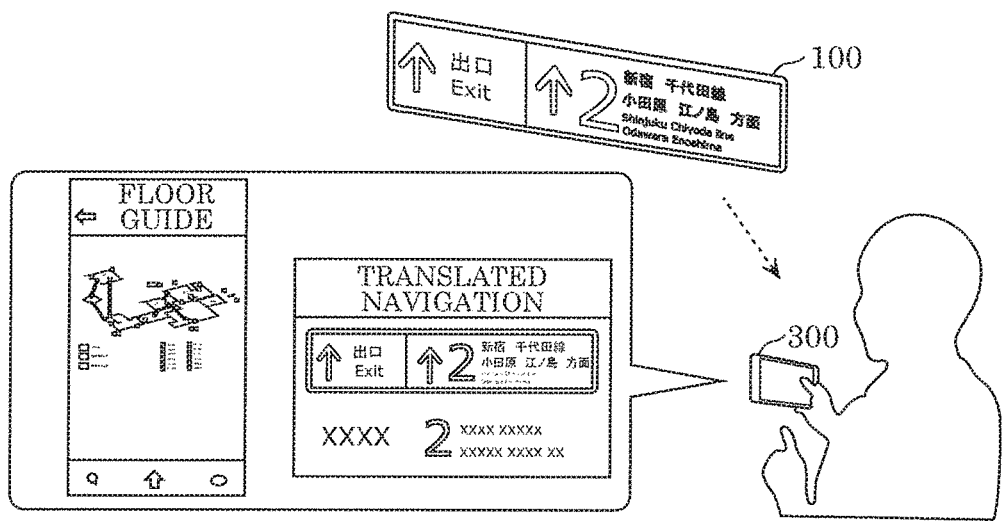
FIG. 15 schematically illustrates one example of a scene used by light sign board 100 according to Embodiment 2.

FIG. 15 schematically illustrates one example of a scene used by light sign board 100 configured as described above.

As illustrated in FIG. 15, light sign board 100 is used as, for example, a navigational sign.

In this example, light sign board 100 displays, on light sign panel 210, a navigational image showing information to be used for guidance. The light forming the navigational image includes a visible light signal of information indicating the information to be used for guidance.

The user using light sign board 100 looks at the navigational image displayed on light sign panel 210, and using his or her reception device 300 that receives visible light signals (here, reception device 300 is exemplified as a smartphone), the user can receive a visible light signal included in the navigational image. The user can also cause reception device 300 to make an output pertaining to information for guidance. Examples of outputs pertaining to information for guidance include a display of supplemental information for the navigational image, a display of text translated from text included in the navigational image, and an output of audio guidance relating to the navigational image.

(5-2. Operations)

Hereinafter, operations performed by visible light communication device 101 included in light sign board 100 having the configuration described above will be described.

Characteristic operations performed by visible light communication device 101 include a fifth abnormal current inhibiting process which is partially different from the first abnormal current inhibiting process according to Embodiment 1.

Hereinafter, the description of the fifth abnormal current inhibiting process will focus on the points of difference from the first abnormal current inhibiting process according to Embodiment 1.

(5-2-1. Fifth Abnormal Current Inhibiting Process)

Figure 16:
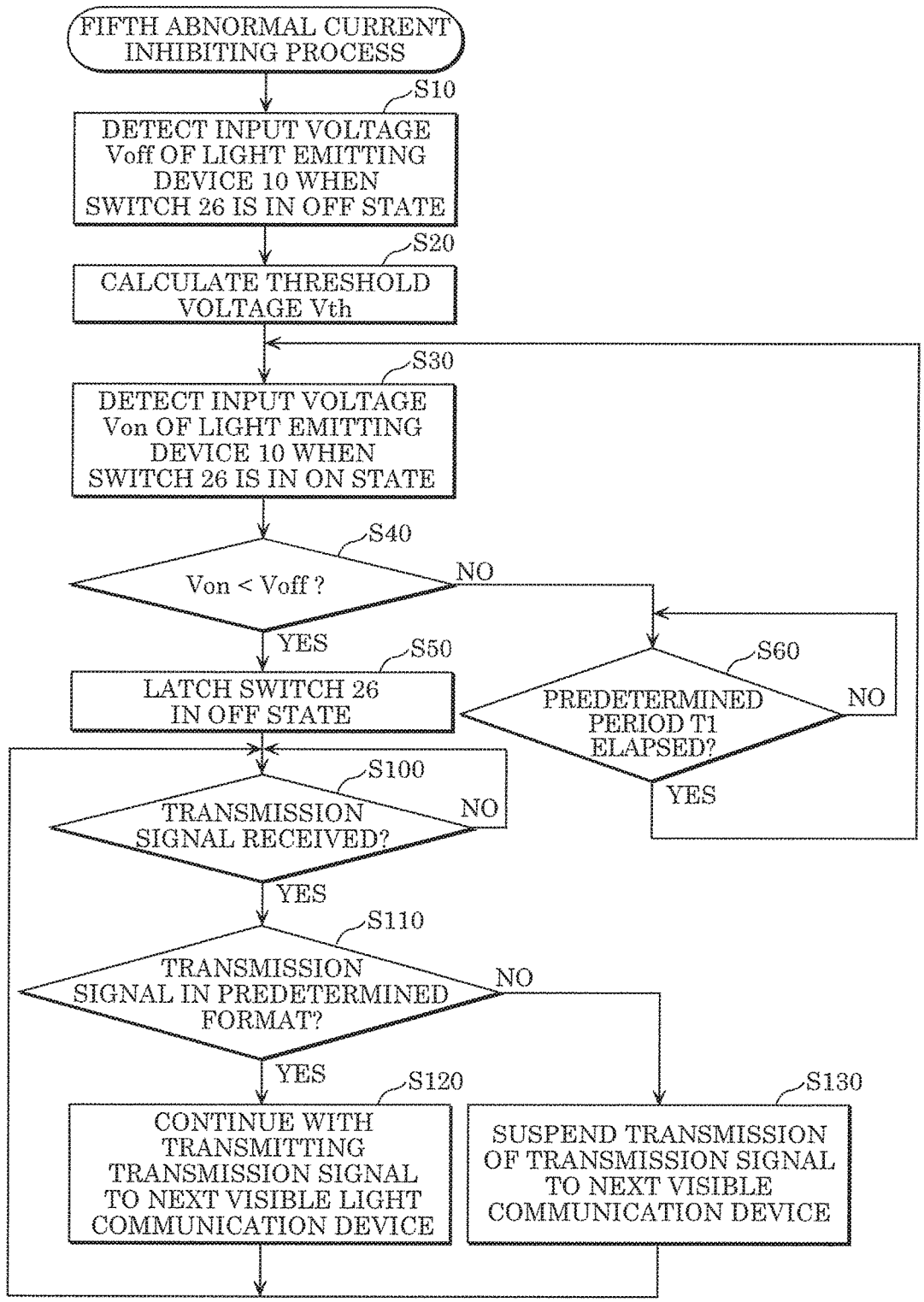
FIG. 16 is a flow chart of a fifth abnormal current inhibiting process according to Embodiment 2.

FIG. 16 is a flow chart of the fifth abnormal current inhibiting process.

As illustrated in FIG. 16, the fifth abnormal current inhibiting process is realized by adding steps S100 through S130 to the first abnormal current inhibiting process according to Embodiment 1.

Accordingly, hereinafter, description will focus on steps S100 through S130.

After completion of step S50, receiver 127 waits until it receives a signal transmitted by wire from transmitter 129 of a preceding visible light communication device 101 (no in step S100 repeats). Here, for example, if the visible light communication device is visible light communication device 101C, "a preceding visible light communication device 101" corresponds to visible light communication device 101B.

When a signal is received in step S100 (yes in step S100), signal determiner 128 determines whether the signal received by receiver 127 is in a predetermined format (step S110).

When the signal is determined to be in a predetermined format in step S110 (yes in step S110), visible light communication device 101 continues with transmitting the transmission signal transmitted from the preceding visible light communication device 101 to the next visible light communication device 101 (step S120). More specifically, signal determiner 128 outputs the signal received by receiver 127 to transmission signal generator 124. Transmission signal generator 124 then outputs the signal output from signal determiner 128 to switch controller 25 and transmitter 129 as a transmission signal. In step S50, since switch controller 25 has already latched switch 26 in an OFF state, the state of switch 26 does not change from the OFF state even if a transmission signal is output by transmission signal generator 124. However, when a transmission signal is output from transmission signal generator 124, transmitter 129 transmits that transmission signal to receiver 127 of the next visible light communication device 101 regardless of whether switch 26 is latched by switch controller 25 or not. Here, for example, if the visible light communication device is visible light communication device 101C, "the next visible light communication device 101" corresponds to visible light communication device 101D.

When the signal is not determined to be in a predetermined format in step S110 (no in step S110), visible light communication device 101 suspends transmission of the transmission signal transmitted from the preceding visible light communication device 101 to the next visible light communication device 101 (step S130). More specifically, signal determiner 128 outputs a transmission suspension signal to transmitter 129. Accordingly, transmitter 129 suspends transmission of the transmission signal by wire to receiver 127 of the next visible light communication device 101.

When step S120 is finished and step S130 is finished, visible light communication device 101 returns to step S100 and repeats step S100 and subsequent steps.

(5-3. Technical Advantages, Etc.)

With light sign board 100 described above, the visible light signals transmitted from light emitting device 10A of visible light communication device 101A through light emitting device 10D of visible light communication device 101D are signals based on the transmission signal generated by transmission signal generator 124 of visible light communication device 101A.

As described above, for example, even if switch 26 of visible light communication device 101B is latched in an OFF state due to a short circuit failure occurring in light emitting device 10B of visible light communication device 101B, the transmission signal transmitted from visible light communication device 101A is transferred to the next visible light communication device 101C only when the transmission signal is the predetermined format.

Accordingly, with light sign board 100, when each visible light communication device 101 transmits a visible light signal based on a single transmission signal, even if a short circuit failure occurs in one of the visible light communication devices, the other visible light communication devices can sustain transmission of that visible light signal.

Other Embodiments, Etc.

Hereinbefore, a visible light communication device and a visible light communication system have been described based on Embodiments 1 and 2 and Variations 1, 2, and 3, but it goes without saying that these embodiments and variations are mere examples, and various changes, additions, and omissions may be made thereto.

Moreover, the order in which the steps (for example, the steps illustrated in FIG. 9 through FIG. 12, FIG. 15) are executed by the above-described visible light communication device are not limited to the orders exemplified above. The order may be rearranged and, for example, some of the steps may be omitted, so long as it does not depart from the scope of the appended claims. Moreover, all or some of the steps (for example, the steps illustrated in FIG. 9 through FIG. 12, FIG. 15) may be implemented via hardware and, alternatively, may be implemented via software. For example, the visible light communication device may be implemented solely by hardware that does not include software (a program).

Moreover, an embodiment realized by selectively combining various elements and functions exemplified in the above embodiments and variations also falls within the scope of the appended claims.

Note that each general and specific aspect of the present disclosure includes one or a combination of, for example, a device, system, method, integrated circuit, computer program, computer-readable storage medium.

Hereinafter, configurations, variations, technical advantages, etc., of a visible light communication device and a visible light communication system according to one aspect of the present disclosure will be described.

(1) A visible light communication device according to one aspect of the present disclosure performs visible light communication and is characterized as including: a light emitting device that emits visible light when current flows to the light emitting device; a power supply circuit that supplies the current that flows to the light emitting device; a switch that switches between an ON state in which the switch passes the current to the light emitting device and an OFF state in which the switch does not pass the current to the light emitting device; a switch controller that controls a state of the switch; a voltage detector that detects an input voltage of the light emitting device; a threshold storage that stores information stipulating a threshold voltage; and a determiner that, when the switch is in the ON state and the voltage detector detects an ON voltage, determines whether the ON voltage satisfies a predetermined relationship with the threshold voltage stipulated by the information stored in the threshold storage. The switch controller further latches the switch in the OFF state when a determination by the determiner is affirmative.

When current flows to the light emitting device, the current decreases the input voltage of the light emitting device.

During the designing stage of the visible light communication device, it is possible to calculate the amount of decrease in input voltage of the light emitting device when normal current flows to the light emitting device and the amount of decrease in input voltage of the light emitting device when a short circuit failure occurs in the light emitting device and an abnormal current flows to light emitting device.

Accordingly, it is possible to set a threshold voltage whereby the input voltage of the light emitting device when a normal current flows to the light emitting device does not satisfy the above-described relationship and the input voltage of the light emitting device when an abnormal current flows to the light emitting device satisfies the above-described relationship.

Thus, with this visible light communication device, by setting the above-described threshold voltage, it is possible to reduce, more so than with conventional techniques, the probability that an abnormal current will flow even when a short circuit failure occurs in the light emitting device.

(2) For example, the information may indicate, when the switch is in the OFF state, a rate for an OFF voltage detected by the voltage detector, the threshold voltage may be stipulated as a mathematical product of the OFF voltage and the rate indicated in the information, and the predetermined relationship may be that the ON voltage is less than the threshold voltage.

With this, no matter which of a plurality of voltages the power supply circuit outputs, the visible light communication device can store a rate in the threshold storage that produces a threshold voltage suitable for each of the voltages. Accordingly, with this visible light communication device, even when the power supply circuit outputs a plurality of voltages, it is possible to reduce the probability of an abnormal current arising from a short circuit failure in the light emitting device from flowing, with respect to each of the voltages.

(3) For example, the voltage detector may repeatedly detect the ON voltage, the determiner may determine whether the ON voltage satisfies the predetermined relationship each time the ON voltage is detected by the voltage detector, and even when the determination by the determiner is affirmative, the switch controller may inhibit the latching of the switch until the determination by the determiner is affirmative N times consecutively, N being an integer greater than or equal to 2.

With this, the switch controller latches the switch in the OFF state only when the determiner produces an affirmative determination N times consecutively. Accordingly, with this visible light communication device, it is possible to reduce the frequency at which the switch is erroneously latched by the switch controller due to the determiner erroneously producing an affirmative determination due to, for example, noise.

(4) For example, the determiner may determine whether the ON voltage satisfies the predetermined relationship only before elapse of a predetermined time starting when the visible light communication device is activated.

Accordingly, with this visible light communication device, it is possible to limit the latching of the switch in the OFF state by the switch controller to only before elapse of a predetermined period starting when the visible light communication device is activated.

(5) For example, the determiner may determine whether the ON voltage satisfies the predetermined relationship only after elapse of a predetermined time starting when the visible light communication device is activated.

Accordingly, with this visible light communication device, it is possible to limit the latching of the switch in the OFF state by the switch controller to only after elapse of a predetermined period starting when the visible light communication device is activated.

(6) For example, the visible light communication device may further include: a receiver that receives a signal transmitted from an external source; a signal determiner that determines whether the signal received by the receiver is in a predetermined format; and a transmitter that, when the receiver receives the signal and a determination of the signal by the signal determiner is affirmative, transmits the signal to an external destination, regardless of whether or not the switch controller has latched the switch.

Accordingly, with this visible light communication device, when a signal of a predetermined format is received, it is possible to output that signal regardless of whether the switch is latched in the OFF state by the switch controller or not.

(7) For example, the visible light communication device may further include: a circuit board on which the switch, the voltage detector, the switch controller, the threshold storage, the determiner, a first connector, and a second connector are disposed; a first power line that connects the power supply circuit and the first connector; and a second power line that connects the second connector and the light emitting device. The first connector and the second connector may be disposed in an approximate center of the circuit board.

With this, the distance between the first connector and the second connector is relatively short. Accordingly, with this visible light communication device, the resistance value on the current path between the first connector and the second connector can be kept relatively low.

(8) For example, the first power line may be shorter in length than the second power line.

Accordingly, with this visible light communication device, it is possible to give the current that flows to the light emitting device a more preferable waveform.

(9) A visible light communication system according to one aspect of the present disclosure is characterized as including: any one of the above-described visible light communication devices; and a reception device that receives a visible light signal transmitted by the visible light communication device.

When current flows to the light emitting device, the current decreases the input voltage of the light emitting device.

During the designing stage of the visible light communication device, it is possible to calculate the amount of decrease in input voltage of the light emitting device when normal current flows to the light emitting device and the amount of decrease in input voltage of the light emitting device when a short circuit failure occurs in the light emitting device and an abnormal current flows to light emitting device.

Accordingly, it is possible to set a threshold voltage whereby the input voltage of the light emitting device when a normal current flows to the light emitting device does not satisfy the above-described relationship and the input voltage of the light emitting device when an abnormal current flows to the light emitting device satisfies the above-described relationship.

Thus, with this visible light communication system, by setting the above-described threshold voltage, it is possible to reduce, more so than with conventional techniques, the probability that an abnormal current will flow even when a short circuit failure occurs in the light emitting device.

What is claimed is:

1. A visible light communication device that performs visible light communication, the visible light communication device comprising:
    a light emitting device that emits visible light when current flows to the light emitting device;
    a power supply circuit that supplies the current that flows to the light emitting device;
    a switch that switches between an ON state in which the switch passes the current to the light emitting device and an OFF state in which the switch does not pass the current to the light emitting device;
    a switch controller that controls a state of the switch;
    a voltage detector that detects an input voltage of the light emitting device;
    a threshold storage that stores information stipulating a threshold voltage; and
    a determiner that, when the switch is in the ON state and the voltage detector detects an ON voltage, determines whether the ON voltage satisfies a predetermined relationship with the threshold voltage stipulated by the information stored in the threshold storage,
    wherein the switch controller further latches the switch in the OFF state when a determination by the determiner is affirmative.

2. The visible light communication device according to claim 1, wherein
    the information indicates, when the switch is in the OFF state, a rate for an OFF voltage detected by the voltage detector,
    the threshold voltage is stipulated as a mathematical product of the OFF voltage and the rate indicated in the information, and
    the predetermined relationship is that the ON voltage is less than the threshold voltage.

3. The visible light communication device according to claim 1, wherein
    the voltage detector repeatedly detects the ON voltage,
    the determiner determines whether the ON voltage satisfies the predetermined relationship each time the ON voltage is detected by the voltage detector, and
    even when the determination by the determiner is affirmative, the switch controller inhibits the latching of the switch until the determination by the determiner is affirmative N times consecutively, N being an integer greater than or equal to 2.

4. The visible light communication device according to claim 1, wherein
    the determiner determines whether the ON voltage satisfies the predetermined relationship only before elapse of a predetermined time starting when the visible light communication device is activated.

5. The visible light communication device according to claim 1, wherein
the determiner determines whether the ON voltage satisfies the predetermined relationship only after elapse of a predetermined time starting when the visible light communication device is activated.

6. The visible light communication device according to claim 1, further comprising:
a receiver that receives a signal transmitted from an external source;
a signal determiner that determines whether the signal received by the receiver is in a predetermined format; and
a transmitter that, when the receiver receives the signal and a determination of the signal by the signal determiner is affirmative, transmits the signal to an external destination, regardless of whether or not the switch controller has latched the switch.

7. The visible light communication device according to claim 1, further comprising:
a circuit board on which the switch, the voltage detector, the switch controller, the threshold storage, the determiner, a first connector, and a second connector are disposed;
a first power line that connects the power supply circuit and the first connector; and
a second power line that connects the second connector and the light emitting device,
wherein the first connector and the second connector are disposed in an approximate center of the circuit board.

8. The visible light communication device according to claim 7, wherein
the first power line is shorter in length than the second power line.

9. A visible light communication system, comprising:
the visible light communication device according to claim 1; and
a reception device that receives a visible light signal transmitted by the visible light communication device.

* * * * *